US005378542A

United States Patent [19]

Hanzalik et al.

[11] Patent Number: 5,378,542

[45] Date of Patent: Jan. 3, 1995

[54] PROCESS FOR SIMULTANEOUSLY COATING MULTIPLE LAYERS OF THERMOREVERSIBLE ORGANOGELS AND COATED ARTICLES PRODUCED THEREBY

[75] Inventors: Kenneth L. Hanzalik, Arden Hills; George H. Crawford, Jr., White Bear Lake; Sharon M. Rozzi, Stillwater, all of Minn.; David J. Scanlan, Fairport, N.Y.

[73] Assignee: Minnesota Mining and Manufacturing Company, St. Paul, Minn.

[21] Appl. No.: 254,531

[22] Filed: Jun. 6, 1994

Related U.S. Application Data

[62] Division of Ser. No. 30,780, Mar. 12, 1993, Pat. No. 5,340,613.

[51] Int. Cl.[6] ........................ B32B 27/06; B32B 27/36

[52] U.S. Cl. .................................... 428/483; 428/501; 428/520; 428/522; 428/523; 428/525

[58] Field of Search .................. 427/388.4, 420, 374.1, 427/374.4, 398.1, 412.5, 412.1; 428/480, 483, 501, 522, 520, 523, 528

[56] References Cited

U.S. PATENT DOCUMENTS

| | | | |
|---|---|---|---|
| 2,245,708 | 6/1941 | Patton | 427/398.1 |
| 2,307,783 | 1/1943 | Malm et al. | 427/398.1 |
| 2,419,010 | 4/1947 | Coffman et al. | 260/88 |
| 2,510,783 | 6/1950 | Johnston et al. | 260/92.1 |
| 2,599,300 | 6/1952 | Upson | 260/94.9 |
| 2,647,296 | 8/1953 | Shive | 28/74 |
| 2,647,488 | 8/1953 | Shive | 118/44 |
| 2,747,998 | 5/1956 | Val Sayre | 95/7 |
| 2,953,818 | 9/1960 | Bartron | 18/57 |
| 3,637,391 | 1/1972 | Saleck et al. | 96/94 |
| 3,847,654 | 11/1974 | Althouse et al. | 427/420 |
| 3,852,096 | 12/1974 | Lundberg et al. | 427/374.4 |
| 3,920,862 | 11/1975 | Damschroder et al. | 427/131 |
| 3,985,565 | 10/1976 | Gabrielsen et al. | 96/114.1 |
| 4,022,617 | 5/1977 | McGuckin | 96/29 D |
| 4,113,903 | 9/1978 | Choinski | 427/420 |
| 4,168,172 | 9/1979 | Kataoka et al. | 427/412.5 |
| 4,173,506 | 11/1979 | Pletcher | 427/374.4 |
| 4,218,533 | 8/1980 | Fuchigami et al. | 430/512 |
| 4,281,060 | 7/1981 | Usami et al. | 430/618 |
| 4,384,015 | 5/1983 | Koepke et al. | 427/402 |
| 4,440,811 | 4/1984 | Hitaka et al. | 427/420 |
| 4,525,392 | 6/1985 | Ishizaki et al. | 427/420 |
| 4,584,267 | 4/1986 | Masukawa et al. | 430/619 |
| 4,647,475 | 3/1987 | Inukai et al. | 427/44 |
| 4,684,551 | 8/1987 | Vassiliou | 427/345 |
| 4,770,989 | 9/1988 | Komamura et al. | 430/553 |
| 4,791,004 | 12/1988 | Suzuki et al. | 427/54.1 |
| 4,966,792 | 10/1990 | Terai et al. | 427/358 |
| 4,981,775 | 1/1991 | Swain et al. | 430/203 |
| 5,071,683 | 12/1991 | Verwilst et al. | 427/420 |
| 5,097,792 | 3/1992 | Umemura et al. | 118/314 |
| 5,132,355 | 7/1992 | Nahlovsky | 524/474 |
| 5,188,789 | 2/1993 | Nishiura | 427/420 |
| 5,202,162 | 4/1993 | Hart, Jr. et al. | 427/374.4 |
| 5,262,374 | 11/1993 | Okabe et al. | 503/201 |

FOREIGN PATENT DOCUMENTS

| | | | |
|---|---|---|---|
| 4421980 | 9/1969 | Japan | 427/398.1 |

OTHER PUBLICATIONS

United States Statutory Invention Registration No. H1003, published Dec. 3, 1991, Ishiwata et al.

*Primary Examiner*—Shrive Beck
*Assistant Examiner*—Diana Dudash
*Attorney, Agent, or Firm*—Gary L. Griswold; Walter N. Kirn; Gregory A. Evearitt

[57] ABSTRACT

Process for the simultaneous application of at least two molten, thermoreversible organogel layers to a substrate. The organogel layers can optionally contain dispersed additive ingredients, such as pigments. The organogel layers are coated onto a suitable substrate and then rapidly cooled or chilled to form a gel. Residual solvent is then removed. Multilayer coated films are thus formed with minimal interlayer mixing or interlayer diffusion of the additive ingredients.

5 Claims, No Drawings

PROCESS FOR SIMULTANEOUSLY COATING MULTIPLE LAYERS OF THERMOREVERSIBLE ORGANOGELS AND COATED ARTICLES PRODUCED THEREBY

This is a division of application Ser. No. 08/030,780 filed Mar. 12, 1993 now U.S. Pat. No. 5,340,613.

FIELD OF THE INVENTION

This invention relates to a process for the application of a multi-layered coating to a substrate and more particularly, it relates to a process for the simultaneous application of multiple layers of molten, thermoreversible organogels to a substrate. This invention also relates to coated multi-layered articles produced by the inventive process.

BACKGROUND OF THE INVENTION

Simultaneous multilayer coating of aqueous gelatin/silver halide emulsions ("photographic emulsions") has been used extensively in the manufacture of photographic films. Photographic emulsions contain aqueous gelatin solutions containing dispersed silver halide grains. In color photographic emulsions, there are present color couplers which are spectrally matched to the sensitization of the silver halide grains. These color couplers are, in turn, contained in dispersed droplets of a water insoluble oil. The individual color coupler molecules have attached oleophilic "ballasting groups", such as tertiary amyl groups, which ensure that the coupler molecule remains dissolved in the oil droplet rather than dissolving into the aqueous phase from which it can undergo interlayer diffusion.

It is essential that the color couplers remain confined within their assigned layers in close association with their correspondingly sensitized silver halide grains. Were the coupler to migrate into a different color layer and react with the wrong silver halide grain, false color renderings would occur (commonly known as "cross-talk").

Simultaneous multilayer coating has the primary advantage of reducing the number of coating steps needed to prepare multi-layered articles. The process for simultaneously applying aqueous gelatin emulsions to form a multilayer film generally involves extruding gelatin emulsions at a temperature above their gel point and then simultaneously coating the extruded gelatin solutions onto a moving web using a coating apparatus (e.g., a slide-hopper). Upon contact with the web, the gelatin-based layers are rapidly cooled below their gel temperature, thereby gelling the individual layers (wherein a rapid qualitative change from liquid to solid properties occurs) and minimizing interlayer mixing, and drying related defects, especially mottle. Subsequently, the coated gelled film is dried to remove excess water. Until now, there has been no disclosure of simultaneously applying organic solvent-based coatings, which can be cooled to organogels, to suitable substrates.

U.S. Pat. No. 4,966,792 describes stacked aqueous gel-forming solutions (e.g., acrylamides) of varying concentration gradients for use in electrophoresis. There is no disclosure of using non-aqueous-based gels.

U.S. Pat. No. 4,525,392 discloses a method for simultaneously applying multiple layers of gelatin solutions to a web. A slide-hopper type coating apparatus is used to coat the solutions. Interlayer mixing is controlled by adjusting the relative flow viscosities of the aqueous gelatin layers flowing on the slide surface.

U.S. Pat. No. 4,384,015 and U.S. Statutory Invention Registration H1003 disclose processes for the simultaneous coating of multiple aqueous gelatin-based layers for photographic applications.

U.S. Pat. No. 3,920,862 discloses multilayer coating of aqueous gelatin solutions incorporating a stripe of recording material.

U.S. Pat. No. 4,791,004 discloses a method for forming multi-layered coated articles by increasing the viscosity of a coated solution followed by a lamination step.

U.S. Pat. No. 4,684,551 discloses an apparatus useful for coating thixotropic polyvinyl fluoride as a plastisol in a latent solvent (i.e., a liquid dispersing agent that becomes a true solvent upon heating). No mention of multiple coatings is made.

U.S. Pat. Nos. 2,647,296 and 2,647,488 disclose a method for coating textile fabric with a polymeric plastisol composition.

U.S. Pat. Nos. 2,419,008, 2,419,010, 2,510,783, 2,599,300, 2,953,818, and 3,139,470 disclose processes for the manufacture of films from orientable polyvinyl fluoride. Those processes involve extrusion of polyvinylidene fluoride dissolved in a solvent. A solvent is mixed with polyvinylidene fluoride and heated until the polyvinyl fluoride particles coalesce. The uniform mixture is extruded and upon rapid cooling forms a self-supporting film which can be further dried.

U.S. Pat. No. 4,281,060 discloses the use of polyisocyanate hardeners to improve multilayer coatability of silver halide-containing photothermographic layers having poly(vinyl butyral) binders.

European Patent Application No. 388,818 discloses a dual slot extrusion coating die for use with non-aqueous coating compositions. It is limited to the application of two layers to a continuously moving web.

What would be desirable in the industry is a process for the simultaneous application of multiple layers of thermoreversible organogels (as defined later herein) to suitable substrates with minimal intermixing of the polymeric layers or critical ingredients (either polymeric or supramolecular) dispersed or dissolved therein.

SUMMARY OF THE INVENTION

The present invention provides a process for the simultaneous application of thermoreversible organogels to substrates. The inventive process comprises the steps of: (a) simultaneously applying at least two molten thermoreversible organogel layers to a substrate; (b) chilling the coated, molten, thermoreversible organogel layers thereby causing them to gel; and (c) removing residual solvent. Optionally, the organogel layers can contain other non-gelling active ingredients dispersed therein such as pigments.

In another embodiment, the invention provides multi-layered, coated articles prepared by the inventive process.

The present invention provides a low cost, efficient method for coating multiple, non-aqueous-based layers while minimizing interlayer mixing. Other aspects, advantages, and benefits of the present invention are apparent from the detailed description, examples, and claims.

As used herein:

"gel" means a mixture of an organic solvent and polymer network wherein the polymer network is formed through physical aggregation of the polymer chains through hydrogen bonds or other bonds of comparable strength.

"hydrogel" means a gel in which the solvent (diluent) is water;

"organogel" means a gel in which the solvent (diluent) is an organic solvent (as opposed to water);

"thermoreversible organogel" is synonymous with "physical organogel" and means an organogel whose network structure is due to weak, thermally unstable bonding such as hydrogen bonding (as opposed to strong, thermally stable bonds such as covalent bonds) and can, therefore, be heated to a free-flowing, liquid (molten) state. (Upon cooling below a characteristic temperature ($T_{gel}$), the bonds reform and the solid-like gel structure is re-established.); and "chill-setting" means forced cooling to expedite the transition from the molten to the solid gel state.

DETAILED DESCRIPTION OF THE INVENTION

According to the present invention, the molten (liquid) organogels are coated above their gelation temperatures ($T_{gel}$). As is understood in the art, the $T_{gel}$ is the temperature at which gel-to-sol transition occurs. It is preferred that the $T_{gel}$ of the molten coating compositions be about between 20° and 70° C. It is also preferred that the molten coating compositions be coated from about 5° to 25° C. above the of the coating composition with the highest $T_{gel}$.

Generally, a thermoreversible organogel is characterized by the observation of a $T_{gel}$. The $T_{gel}$ may be determined by several different criteria, such as, for example, the temperature at which: (a) when a liquid composition is cooled, there is a rapid, discrete, qualitative change from liquid to solid properties; (b) when a liquid composition is cooled, there is a sudden increase in hydrodynamic radius, as measured by dynamic light scattering methods; (c) when a liquid composition is warmed, a 1 mm drop of mercury will flow through the composition; and (d) the elastic and viscous moduli are equivalent.

Although not wishing to be bound by theory, Applicants postulate that thermoreversible organogels suitable for use in the present invention may contain a polymer or copolymer wherein the polymer or copolymer chain contains two or more different functional groups or discrete regions, e.g., syndiotactic sequences prone to crystallite formation in a solvent or solvent mixture.

Non-limiting examples of liquid compositions that form thermoreversible organogels at or near room temperature are amine-substituted polystyrene in tetrahydronapthalene; vinylidene chloride/methyl acrylate copolymers in benzene, toluene, chlorobenzene, m-dichlorobenzene, or o-dichlorobenzene; acrylonitrile/vinyl acetate copolymers in dimethylacetamide; poly(vinyl chloride) in dioctyl phthalate or dibutyl phthalate; poly(acrylonitrile) in dimethylformamide or dimethylacetamide; nitrocellulose in ethyl alcohol; and poly(methyl methacrylate) in N,N-dimethylformamide.

Especially preferable thermoreversible gels for use in the present invention are gels of poly(vinyl butyral) in mixtures of toluene and 2-butanone, i.e., methyl ethyl ketone or MEK.

Organogels of poly(vinyl butyral) may be prepared by combining poly(vinyl butyral) polymers preferably having a high hydroxyl content with an appropriate solvent blend. Non-limiting examples of useful poly(vinyl butyral) polymers include Butvar™ B-72, Butvar™ B-73, Butvar™ B-74, Butvar™ B-90, and Butvar™ B-98 (all available from Monsanto Company, St. Louis, Mo.). Especially useful is Butvar™ B-72 which has a poly(vinyl alcohol) content of from 17.5–20.0 weight percent. The requirements of the solvent blend are that it must not interact with poly(vinyl alcohol) sites along the polymer chain and thereby interfere with the polymeric binder's ability to undergo hydrogen bonding with itself through the hydroxyl groups, yet it must solvate the polymer at the non-hydroxyl sites.

In coating molten thermoreversible organogel solutions, it is necessary to coat at temperatures above the $T_{gel}$ of the organogel. On the other hand, it is desirable to perform the coating at the lowest possible temperature above $T_{gel}$ in order to facilitate rapid onset of gelation after coating. It has been found advantageous to provide a "chill-box" or similar rapid chilling mechanism which functions immediately after the coating operation to trigger rapid gelation to inhibit interlayer mixing. Preferably, the molten organogel temperatures during coating should be 5° to 25° C. above $T_{gel}$. More preferably, the molten organogel temperatures during coating should be from about 10° to about 15° C. above $T_{gel}$.

The coating solutions or dispersions are solidified organogels at or near room temperature and liquids at a modest elevated temperature. The solutions are warmed to 5° to 25° C. above their $T_{gel}$ so that they are liquids. The molten solutions are simultaneously applied onto a web by extrusion (e.g., by curtain coating; by slide coating, such as disclosed in U.S. Statutory Invention Registration H1003; or by slot coating as disclosed in U.S. Pat. No. 4,647,475, the disclosures of which are hereby incorporated by reference). The solutions may also be applied to the web by knife coating, but extrusion is preferred. Once the layers are on the web, the coated layers are rapidly cooled below $T_{gel}$, preferably by a "chill-set" device as disclosed earlier herein. The web is cooled so that the layers gel and diffusion between the coated layers on the web is minimized by the rapid transition to the solid state.

One preferred coating device for multi-layer coating of thermoreversible organogels is a multi-slide coater as disclosed in U.S. Statutory Invention Registration H1003. The principal solution requirement for slide coating is that the solution be a gel at or near room temperature and a low viscosity fluid at modestly elevated temperatures such as from 25° to 70° C.

A typical slide coating apparatus consists of a multilayer slide coating die tilted, for example, at 35°. The feed solutions, pumps, and hoppers are immersed in a constant temperature bath maintained at approximately 65° C. The feed lines and coating die are jacketed with hot water circulated from this water bath. A chill box is mounted approximately one foot from the coating die and maintained at a temperature sufficiently below the lowest $T_{gel}$ of the solutions containing the multilayer coating so as to produce rapid "chill setting", e.g., 0° to −70° C. The use of cold air moving over the surface of the coating enhances the "chill set" effect by evaporative cooling of the volatile solvent.

An advantage of the thermoreversible organogels used in the present invention is that they often undergo chill-setting more rapidly than equivalent (in terms of concentration, bloom number, and $T_{gel}$) aqueous gelatin solutions, provided an adequate chill box is employed.

Typical web speeds are from about 1 to 1000 ft./min., preferably from about 50 to 400 ft./min. and wet coating thicknesses range from about 1 to 300 μm, preferably from about 12 to 120 μm per layer. When coatings are applied according to the present invention, a sharp interface is observed between the two layers after cooling and drying.

In addition, extrusion-type coating can be used to practice the present invention. Two or more kinds of non-aqueous coating solutions are fed to a coating head from liquid reservoirs by quantitative liquid transfer pumps. The coating solutions are applied to a continuously traveling web at an extrusion bead-forming area. This multilayer-type coating procedure is called extrusion-type coating because the coating liquid compositions are extruded onto a continuously traveling web.

A single- or multi-blade knife-type coating apparatus can also be used in a method of the present invention. Such apparatus are well known to those skilled in the art and are commercially available.

In the methods of the present invention, the molten organogels preferably have viscosities between about 15 and 100 centipoise at a shear rate of 100 $sec^{-1}$ at the temperature at which they are coated.

After the application of the molten organogels to the web, the organogels are cooled to a temperature below the $T_{gel}$ of the organogel to solidify the layers and prevent mixing between two layers from occurring. The time until arrival at the chilling device after formation of the multilayer coated film is related to the properties of the coating solution, but the time preferably is within 5 seconds from the viewpoint of preventing diffusion and mixing.

Drying of organogel coated articles prepared according to the present invention may be accomplished by means widely known in the coating and including, but not limited to, oven drying, forced air drying, drying under reduced pressure, etc.

The organogel coating process of the present invention is quite effective at preventing diffusion between layers when the components of adjacent organogel layers are polymeric, macromolecular, and/or insoluble in the coating solvent. In cases in which small, solvent-soluble components are present as ingredients in an organogel layer, interdiffusion between layers occurs even after gelation is complete. However, when insoluble components such as pigments and polymers are included as ingredients, little or no minimal interlayer diffusion is observed.

The following non-limiting examples further illustrate the present invention.

EXAMPLE 1

This example demonstrates that a molten organogel solution can be extruded as a hot liquid and then quickly gelled after it contacts the surface of a substrate material wrapped around a chilled wheel.

A molten organogel sample consisting of 5 g Butvar™ B-72 [poly(vinyl butyral), available from Monsanto Company, St. Louis, Mo.] in 100 ml toluene/MEK (70/30) by volume was melted in a water bath maintained at 65° C. About 30 ml of this molten organogel solution was drawn up into a syringe and quickly placed in the extrusion bracket of a slide coater of the type disclosed in U.S. Statutory Invention Registration H1003. This part of the coater was maintained at about 65° C. The plunger mechanism was started and a steady stream of solution was established. The wheel was wrapped with one turn of a strip of 0.051 mm poly(ethylene terephthalate) PET. The wheel was brought up to a speed equivalent to 0.254 m/sec. The needle was moved to the coating position (0.89 mm gap) for a duration of one revolution of the wheel. The solution gelled almost instantaneously as it hit the PET surface which was at room temperature. The coating was in the form of a narrow strip of uniform width (approximately 0.254 mm). The coating was "solid" to the touch immediately after the wheel had concluded its single revolution.

EXAMPLE 2

General Procedure for Preparation of Dispersions: a fine dispersion of pigment in a binder was prepared by combining 0.2 g of the pigment with 100 ml of a solvent blend comprising 40 parts by volume toluene and 60 pans by volume 2-butanone (MEK) in a high shear Waring Blender (special explosion-resistant model). The blender was run 5 minutes on the "low" setting, then 3 minutes on the "high" setting. The dispersion was then filtered through Whatman #4 open texture filter paper to remove any large particles. Butvar™ B-98 poly(vinyl butyral) resin, available from Monsanto, was slowly added to the dispersion with rapid stirring to achieve a wt/vol concentration of 12%. As the Butvar™ B-98 was added to the pigment dispersion, the mixture gradually set up to a semi-solid state. After all the Butvar™ B-98 had been introduced, heating was begun while continuing the stirring. As the temperature rose to 60°-70° C., a pourable liquid dispersion formed. Three such dispersions were prepared wherein the pigments were selected to correspond to cyan, magenta, and yellow. The pigments employed were:

| | |
|---|---|
| "Ramapo Blue BF" (DuPont) | Cyan |
| "Hostaperm Pink B" (Hoechst) | Magenta |
| "Graphitol Yellow 4432-0" (Sandoz) | Yellow |

A double-knife coater was used to coat the dispersions. In order to be able to coat heated solutions (required for molten gel coating) the coater bed and knives were provided with resistance heating. The temperature of the bed and knives was regulated to be at least 10° C. above $T_{gel}$ of the dispersion.

A chill box was used to promote rapid gelation. The box was 90 cm×35 cm×20 cm deep. An aluminum plate rested on a bed of dry ice. The box was provided with a styrofoam lid. Once the coating was made, it was placed on the aluminum plate to chill-set the organogel.

The substrate used was 0.102 mm white pigmented polyester, 30.5 cm wide, overcoated with a polyvinylidene dichloride copolymer layer that allowed for the release of the coating so that clear cross-section photomicrographs could be taken of the coated layers. In order to promote release of the coating, a surfactant was added to solution #1 at a concentration of 1% of the mass of the binder. This was introduced as a 10% solution in a solvent blend identical to the blend used in the coating solution.

The substrate was cut to a length suitable to the volume of solution used, ca. 75 cm, and after raising the hinged knives, placed in position on the warm coater bed. The knives were then lowered and locked into place. The height of the knives was adjusted with wedges controlled by screw knobs and measured with electronic gauges. The knives were zeroed onto the substrate and knife #1 was raised to a clearance corresponding to the desired wet thickness of layer #1 (0.152 mm). Knife #2 was raised to a height equal to the desired wet thickness of layer #1 plus the desired wet thickness of layer #2 (0.304 mm).

Aliquots of each coating solution (10 ml) were maintained at 60° C. in a thermostatted water bath. As soon as the setup was complete, aliquots of solutions #1 and #2 were simultaneously poured onto the warm substrate in front of the corresponding knives. The substrate was immediately drawn past the knives so that a double coating was produced. The coated substrate was immediately placed in the chill box which was then closed. After 5 minutes the substrate bearing the gelled coating was returned to the coater bed, the knives having been readjusted to accommodate wet layers #1 and #2 plus layers #3 and #4 (i.e., 0.456 mm and 0.608 mm, respectively). Coating solution #3 was a clear solution (no pigment) and coating #4 was the magenta. The coating and chill-setting procedures were repeated, after which the coated substrate was air dried for 30 min. Ideally, the four-layer coating would have appeared black, but since no attempt at color balance had been made, it appeared dark green.

The dark green coating was peeled from the release surface so that it comprised a free-standing film with no substrate. Samples ca. 1 mm wide were cut with razor blades and examined under an Olympus Model "BH" microscope in cross-section. The microscope was fitted with a Polaroid camera. Type 668 color film was used to obtain photomicrographs. The four layers were clearly visible to the eye as well defined layers with distinct boundaries. Photomicrographs at 630X magnification clearly showed the layers to be composed of four distinct color layers and totalling approximately 54 microns thick. These layers are in order: magenta (20 μm)—clear(4 μm)—yellow (15 μm)—cyan (15 μm).

EXAMPLE 3

A dispersion of Ramapo Blue BF TM (0.2%) in 40/60 toluene/MEK was prepared according to the procedure of Example 2. This was combined with Butvar TM B-98 to form a gelable solution. A gelable solution of Graphitol TM Yellow 4432-0 was prepared in the same manner. Using the double knife coater and the procedure of Example 2, a simultaneous 0.305 mm wet thickness two-layer coating was prepared, chill-set, and dried. Color photomicrographs of these coatings (400X cross-section) clearly showed the presence of two layers, cyan and yellow.

EXAMPLE 4

This example was conducted in exactly the same way as Example 3, except that Butvar TM B-76 poly(vinyl butyral) resin, available from Monsanto, was substituted for the Butvar TM B-98 in both coating solutions. Butvar TM B-76 is of the same poly(vinyl butyral) family as Butvar TM B-98, but has a lower hydroxyl content and does not form gels under the conditions of this example. Color photomicrographs (400X) showed that the layers had completely merged into a single greenish-gray layer. This demonstrates that gelation is necessary to maintain layer integrity.

EXAMPLE 5

A gelable polymer solution was prepared by dissolving Geon TM 178 (an intermediate molecular weight polyvinyl chloride, available from B. F. Goodrich) in a 50/50 (vol.) mixture of toluene/MEK. The polymer produced a clear solution at 70° C. that gelled rapidly at 10° C. Gelation was slower than with an equivalent amount of Butvar TM B-73 poly(vinyl butyral) resin, available from Monsanto, in the same solvent. This was coated onto the release-coated substrate as in Example 2 as a single 0.152 μm wet layer, and air dried 30 min. Over the clear layer was then coated a dispersion of Ramapo TM Blue BF prepared as in Example 2 (using Butvar TM B-98), chill-set, and air dried. A 400X cross section showed two layers (clear and cyan).

EXAMPLE 6

Example 5 was repeated except that the two layers were coated simultaneously as a 0.305 μm wet thickness double layer. A color photomicrograph showed a discrete pair of layers. It appeared that the boundary between the layers was cleaner, straighter, and better defined in the simultaneously coated material than in the sequentially coated material of Example 5.

Reasonable modifications and variations are possible from the foregoing disclosure without departing from either the spirit or scope of the present invention as defined in the claims.

We claim:

1. A coated article prepared by the process comprising the steps of:

(a) simultaneously applying at least two molten thermoreversible organogel layers to a substrate, said organogel layers consisting essentially of a polymer; an organic solvent or blend of organic solvents; and one or more non-gelling additive ingredients dispersed therein and which remain confined within each of said organogel layers; and (b) chilling the molten, thermoreversible organogel layers, thereby causing them to gel.

2. The coated article according to claim 1 prepared by the process further comprising removing residual solvent.

3. The coated article according to claim 1 wherein said non-gelling additive ingredient is a pigment.

4. The coated article according to claim 1 wherein said polymer is poly(vinyl butyral).

5. The coated article according to claim 1 wherein each individual molten organogel layer is coated at a temperature of from 10° to 15° C. above the $T_{gel}$ of each said individual organogel layers.

* * * * *